United States Patent [19]
Smith et al.

[11] Patent Number: 5,784,026
[45] Date of Patent: Jul. 21, 1998

[54] RADAR DETECTION OF ACCELERATING AIRBORNE TARGETS

[75] Inventors: Winthrop Whitman Smith; George Marvin Eargle, both of Greenville, Tex.

[73] Assignee: Raytheon E-Systems, Inc., Dallas, Tex.

[21] Appl. No.: 710,892

[22] Filed: Sep. 23, 1996

[51] Int. Cl.$^6$ .................................................. G01S 13/53
[52] U.S. Cl. ........................ 342/160; 342/161; 342/162; 342/196; 342/106
[58] Field of Search ........................... 342/162, 160, 342/161, 192, 197, 106, 196

[56] References Cited

U.S. PATENT DOCUMENTS

| | | | |
|---|---|---|---|
| 3,775,768 | 11/1973 | Lisle et al. | 342/101 |
| 3,787,849 | 1/1974 | Sletten et al. | 342/161 |
| 3,787,851 | 1/1974 | Hughes | 342/161 |
| 3,803,598 | 4/1974 | Abernathy et al. | 342/192 |
| 3,877,010 | 4/1975 | Holberg et al. | 342/161 |
| 3,879,729 | 4/1975 | Nevin | 342/161 |
| 4,132,990 | 1/1979 | Di Domizio et al. | 342/89 |
| 4,339,754 | 7/1982 | Hammers et al. | 342/89 |
| 4,914,442 | 4/1990 | Kretschmer, Jr., et al. | 342/162 |
| 4,931,800 | 6/1990 | Ward | 342/162 |
| 4,965,585 | 10/1990 | Lepere et al. | 342/160 |
| 5,151,702 | 9/1992 | Urkowitz | 342/134 |
| 5,173,706 | 12/1992 | Urkowitz | 342/99 |
| 5,235,338 | 8/1993 | Hsiao et al. | 342/109 |
| 5,341,142 | 8/1994 | Reis et al. | 342/64 |
| 5,376,939 | 12/1994 | Urkowitz | 342/134 |
| 5,440,311 | 8/1995 | Gallagher et al. | 342/132 |
| 5,486,833 | 1/1996 | Barrett | 342/204 |

*Primary Examiner*—John B. Sotomayor
*Attorney, Agent, or Firm*—Baker & Botts, L.L.P.

[57] ABSTRACT

Radar detection of accelerating airborne targets in accordance with the present invention utilizing a sequence of velocity, acceleration matched filters. This system includes a transmitter generating a signal oscillating at a predetermined frequency controlled by modulator such that the transmitter repeatedly outputs short duration pulses. The output pulse frequency is passed to an antenna that radiates the energy into free space. Reflected electromagnetic wave energy is received by the antenna to produce a radar return signal that is processed to a receiver that includes a radio frequency amplifier having an output that is mixed with a local oscillator signal an applied to an IF amplifier. An output of the IF amplifier is mixed with the output of an IF oscillator where the mixed signal passes through a low pass filter to a pulse compression network. An output of the pulse compression network is input to a matched filter processor array having multiple outputs applied to an adaptive threshold detector. Outputs from the adaptive threshold detector are applied to a display for creating human intelligent information.

18 Claims, 4 Drawing Sheets

FIG. 5

INPUT → FFT (68) → ⊗ (64) ← H(f) → IFFT (66) → OUTPUT

FIG. 6

RADAR DETECTION OF ACCELERATING AIRBORNE TARGETS

This invention relates to the detection of airborne moving targets from an airborne sensor platform, and more particularly to apparatus and a method for detection of airborne moving targets utilizing match filtering to measure the radar acceleration return from a transmitted radar signal.

BACKGROUND OF THE INVENTION

The classical approach for detecting targets against a clutter background is to discriminate based on the Doppler motion of the target. For aircraft targets from a stationary platform, this is a valid approach inasmuch as the aircraft has a significant velocity relative to the ground. However, if the target has little radial velocity with reference to the emitter, its Doppler shift is the same as some portion of the ground clutter viewed by a long range radar sensor. Therefore, the target is masked by the ground clutter return. Heretofore, several techniques have been proposed for detecting moving targets utilizing processors for enhancing the detection of moving target signals in the presence of ground returns of significantly greater power. Moving target detection enhancement is usually achieved by frequency filtering techniques based on the difference in Doppler frequency shift between stationary and moving targets.

Moving target indication (MTI) radar systems and pulsed radar systems presently available attempt to separate moving targets from fixed targets utilizing the Doppler effect. MTI radars and pulsed radars typically transmit periodic pulses, and make use of the variations of the phase between the transmitted wave and the received echo wave from one pulse to another, to detect moving targets. In such radar systems, the phase of the transmitted wave is stored during each pulse repetition period and then compared with the phase of the return signal (echo wave). The relative phase is constant for one repetition period to the next repetition period for waves reflected from fixed targets, while the phase varies with time for the case of return signals from a target moving with a radial velocity greater than zero with respect to the antenna sensor. A processor compares the stored phase reference signal for each repetition period with the return signal and produces constant amplitude pulses for fixed targets and pulses whose amplitudes vary sinusoidally at the "Doppler frequency" for moving targets. A particular difficult situation exists when the radar system is operating in a "down look" mode where the target return is time coincident with ground clutter.

Evaluation of prior moving target indicators operating at a low pulse repetition frequency (PRF), (pulse Doppler radars) show that such radars have the ability to detect and track targets in a down look operating mode when the return time is coincident with heavy ground clutter. This capability is achieved by discriminating against stationary ground return signals in the frequency domain while separating return signals from moving targets whose Doppler frequencies differ from the Doppler frequency of the stationary ground clutter. A characteristic feature of such a moving target indicator is that the transmitted signal must be coherent with a reference signal in the receiver.

For a high speed aircraft radar platform, the clutter return spectrum spreads due to the Doppler shift caused by the relative velocity. Such clutter spread could be overcome by use of a high PRF, however, this results in ambiguous range information at long ranges due to the fact that the radar return signal is received after a subsequent transmitted pulse.

In order to provide an unambiguous range operation a relatively low PRF is preferred. A characteristic of a relatively low PRF radar is that it is unable to determine unambiguously the velocity of detected targets based on Doppler information. This characteristic has been found to be detrimental when searching from airborne targets where relatively slow moving surface vehicles are also encountered.

Another known approach to the problem of moving target indication is the utilization of very wide clutter rejection filters which not only reject stationary ground clutter, but also the Doppler frequencies associated with low velocity surface vehicles. This approach, however, requires the use of higher PRF's than would otherwise be used inasmuch as a rejection band wide enough for typical surface traffic would occupy the entire intra-PRF Doppler interval in a low PRF radar. Also, the problem to this solution is that the wide rejection band aggravates the low PRF pulse Doppler "blind speed" problem.

SUMMARY

In accordance with the present invention, there is provided apparatus and a method for radar detection of accelerating airborne targets utilizing a sequence of velocity acceleration matched filters that are centered outside the clutter acceleration return followed by adaptive thresholding of the filter outputs to detect the target. A weighting function may be applied to the matched filter input data to control side lobe effects of the filter to minimize main beam clutter leakthrough to the side lobes thereby causing false detections.

Further in accordance with the present invention, there is provided apparatus for analyzing received signals from a pulse radar system to detect accelerating targets against a cluttered background that includes a matched filter array having a plurality of finite impulse response filters or a plurality of linear filters where each filter in the array has a coefficient that matches the center frequencies and the rates of change of the frequency to position each filter in the array to pass specific target acceleration rates and attenuation of ground clutter acceleration. In addition, apparatus of the present invention includes a threshold detector array having a plurality of detectors equal in number to the plurality of fine impulse response filters or linear filters and connected in a one-on-one arrangement to each filter in the array. Each detector has a threshold set to a level established by the position of the detector in the array and the responses of the filters in the neighborhood of the particular filter connected to the detector.

Further in accordance with the present invention, there is provided a method for analyzing signals received from a pulsed radar system to detect accelerating airborne targets against a clutter background that includes filtering the received signals through a matched filter array that includes a plurality of finite impulse response filters or linear filters. The center frequencies and rates of change of frequency of each filter are adjusted to the position of each filter in the array to pass specific target acceleration rates and attenuation of ground clutter acceleration. An output from each of the filters is detected in one of a plurality of threshold detectors in an array wherein the threshold for each detector is set to a level established by the position of the detector in the array.

BRIEF DESCRIPTION OF THE DRAWINGS

For a more complete understanding of the present invention and the advantages thereof, reference is made to the following detailed description taken in conjunction with accompanying drawings wherein:

FIG. 5 is a block diagram of frequency domain filtering as part of the array of FIG. 3;

FIG. 6 is a block diagram of a sliding window integrator illustrating one embodiment of the adaptive threshold detector of FIG. 1.

DETAILED DESCRIPTION OF THE DRAWINGS

In accordance with the present invention, there is provided apparatus and method for suppressing clutter in non-coherent and coherent Doppler radar to provide improved detection of moving targets in clutter caused by stationary or slowly moving objects such as land or sea surfaces. Theoretically, the demodulated output of a Doppler radar is at zero frequency for a return signal ("echo") due to a stationary object. However, because of a number of factors including radar instabilities due, for example, to pulse-to-pulse variations in transmit frequency and transmit pulse amplitude, the output frequency of a Doppler radar caused by a stationary object fluctuates. The result, Doppler radar output caused by stationary objects is spread in frequency and at times is stronger than the Doppler output caused by rapidly moving targets.

The motion of an antenna beam that scans across an extended rough surface, due for example to trees, land or sea, causes yet another source of frequency shifted clutter output in a Doppler radar, even if the beam motion is perpendicular to the radar line of sight. When an antenna beam moves across such an area, the particular elements of the area that are being momentarily viewed by the radar look to the beam as if they are continuously changing so as to cause random return signal amplitude fluctuations. Additionally, because the clutter at different azimuth angles in the beam will have different Doppler frequency components, the Doppler spectrum of the return signal is spread significantly.

In a conventional receiver for a non-coherent radar system, the radar return signal output from the radar antenna is mixed with a local oscillator signal to an intermediate frequency (IF), amplified and detected with an envelope detector, amplified again and integrated to improve signal-to-noise ratio. The detected radar return signal output from the integrator is then further processed to facilitate human perception and the recognition of any detected objects. Typically, this involves amplifying the signal for video display on a cathode ray tube in a particular format (for example, on a plan position indicator display).

Figure 1:
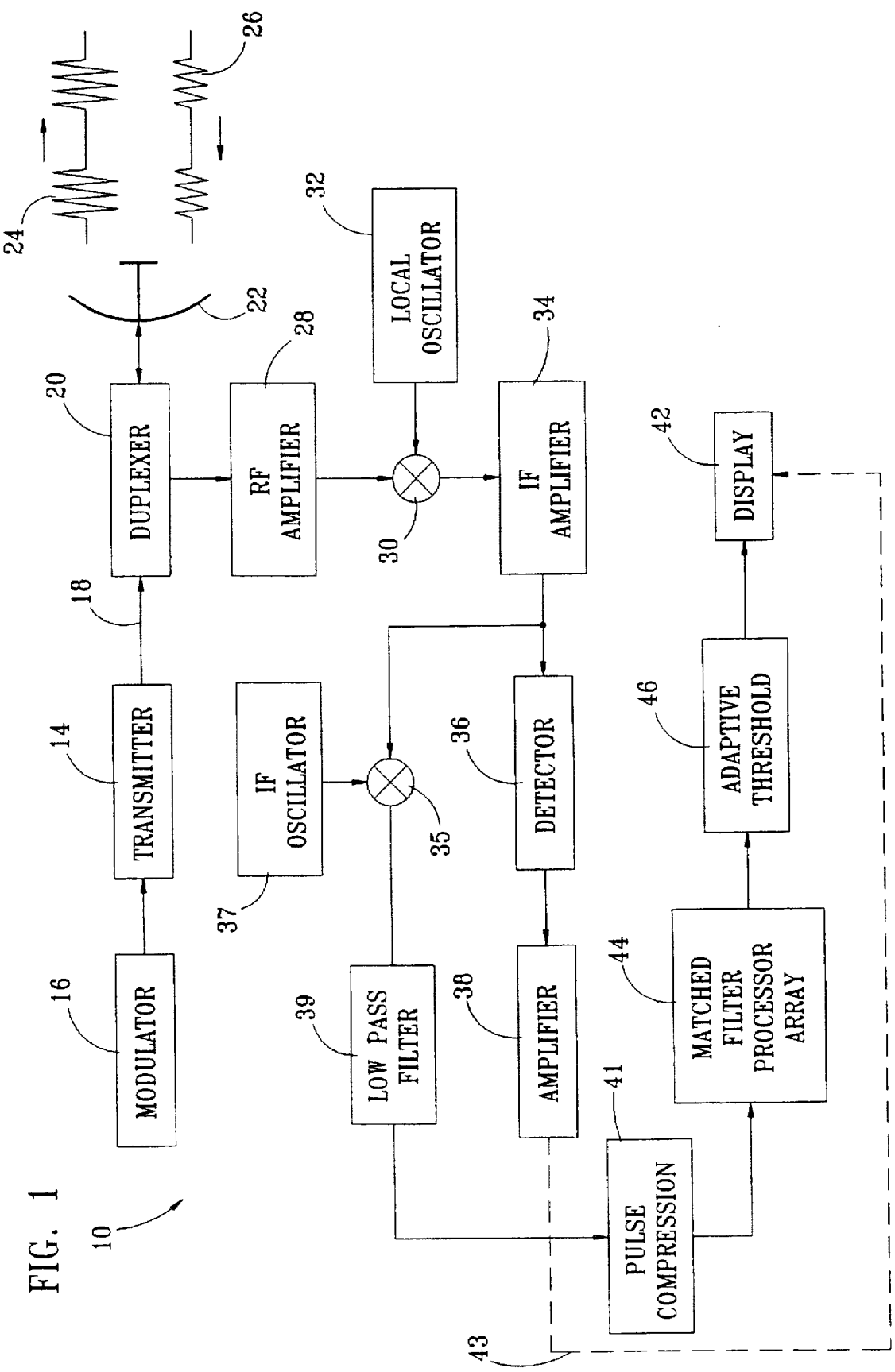
FIG. 1 is a system block diagram of a radar system configuration for detection of accelerating airborne targets against a clutter background.

Referring now to FIG. 1, there is shown a block diagram of a non-coherent radar system 10 that includes a transmitter 14 for generating an amplified signal oscillating at a predetermined frequency (f). Operation of the transmitter 14 to produce the oscillating frequency signal is controlled by a modulator 16 such that the transmitter repetitively outputs short duration pulses over line 18. Each pulse output from the transmitter 14 comprises several cycles of energy at the frequency (f). The generated and output pulse frequency signal is passed by a duplexer 20 to an antenna 22 that radiates the energy of the pulse signal into free space as a pulse electromagnetic wave 24.

When the radiated pulse electromagnetic wave 24 strikes and is reflected by an object in its path, a pulse echo wave 26 of substantially less signal strength is generated. The pulsed echo wave 26 includes both target echoes and clutter echoes. Both the target echo wave and the clutter echo wave of the pulsed echo wave 26 are received by the antenna 22 to produce a radar return signal that is passed by the duplexer 20 to a receiver for the radar system. The receiver includes a radio frequency amplifier 28 where the return signal, including the target return signal and the clutter return signal are amplified and applied to the first input of a mixer 30. The second input to the mixer 30 receives the output of a local oscillator 32 generating a signal oscillating at a predetermined frequency (f+$f_1$) wherein the frequency ($f_1$) is referred to as the "IF" or "Intermediate Frequency".

At the output of the mixer 30, there is generated an Intermediate Frequency radar return signal comprising a train of pulses with each pulse composed of oscillations at the Intermediate Frequency ($f_1$). The Intermediate Frequency radar return signal is amplified by an IF amplifier 34, rectified and low pass filtered by an envelope detector 36, and further amplified by an amplifier 38.

In a conventional non-coherent radar system, the radar return signal at the output of the amplifier 38 is next processed, as generally indicated by a dotted line 43 and applied to a display 42 to provide a visual indication of any object detected by the radar system. However, in the improved radar system of the present invention, the output of the IF amplifier 34 is applied to the first input of a mixer 35. The second input to the mixer 35 receives the output of an IF oscillator 37 generating a signal oscillating at a predetermined frequency ($f_1$). The output of the mixer 35 is received by a low pass filter 39 which filters out the mixer's upper sideband output. The output of the low pass filter 39 is applied through a pulse compression network 41 to a matched filter processor array 44 having an output applied to an adaptive threshold detector 46 that may be implemented by means of a sliding window integrator (SWI).

For airborne radar systems that are moving at nearly constant velocity, the acceleration of the ground relative to the system is small. Therefore, accelerating targets, even those with small radial velocities with respect to the system, are almost always separated in acceleration from the ground. The present invention utilizes this observation to modify the conventional coherent radar system by the addition in the processing loop of a matched filter to measure the radar acceleration return from the transmitted radar signal to separate accelerated target return energy from the ground return energy so that the targets can be detected.

The PRF of standard pulse Doppler radars falls into three classes. The key in deciding which of the three ranges of PRF's will achieve the desired results for acceleration processing of the radar return signal is that the acceleration feature of the return signal is not ambiguous for radar detection of accelerating airborne targets against a clutter background. If a high PRF or medium PRF is used, however, there will be multiple ranges returning clutter at the same time as the target. Most of these ranges will be closer to the antenna 22 than the target and, therefore, the clutter level will be higher and the acceleration spread will be greater. Both of these are detrimental to performing target detection. This suggests that a low PRF radar is best suited for this application and the radar system of FIG. 1 may be implemented using a low PRF radar system.

Returning to FIG. 1, in one embodiment of the present invention the matched filter processor array 44 is implemented as an array of finite impulse response (FIR) filters with coefficients that match the center frequencies and rates of change of frequency to position individual filters in the array for passing specific target acceleration rates while attenuating ground clutter acceleration.

Figure 2:
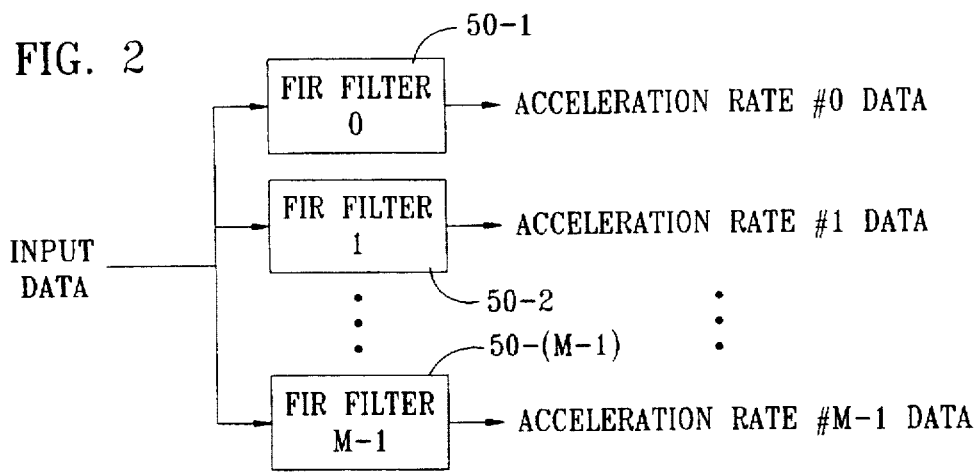
FIG. 2 is a block diagram of a finite impulse response (FIR) filter array as one implementation of the matched filter processor array of FIG. 1.

Referring to FIG. 2, there is shown a block diagram of an embodiment of the matched filter processor array 44 comprising FIR filters 50-1 and 50-2 through 50-(M−1). The input data to each of the FIR filters 50−1 through 50-(M−1) is the output of the pulse compression network 41. The output of each of the filters is applied to an individual detector of the adaptive threshold detector 46 as will be explained.

Figure 4:
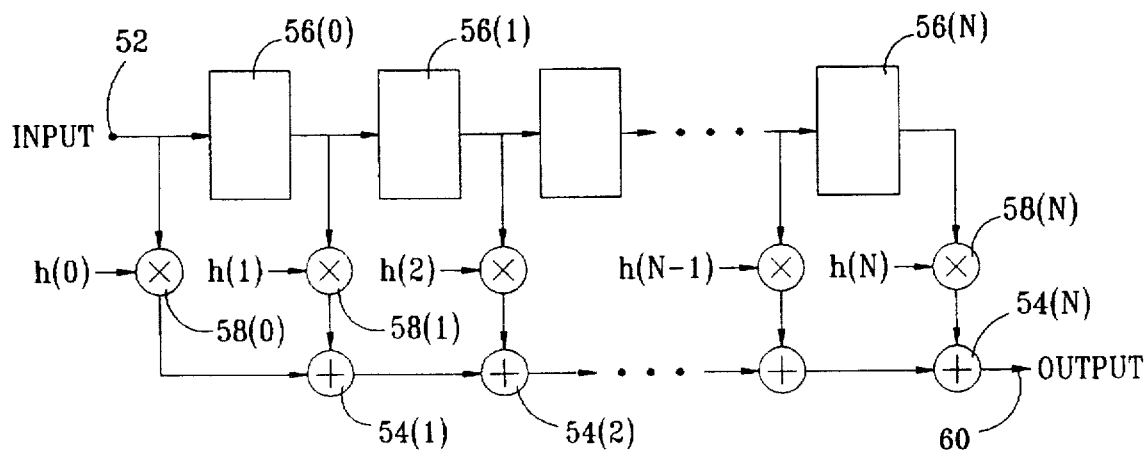
FIG. 4 is a block diagram of a finite impulse response filter for the array of FIG. 2.

Referring to FIG. 4, there is shown a block diagram of an FIR filter of the processor array shown in FIG. 2. The multiplier coefficients, h(i), are selected to match the acceleration and velocity rates of the detector which is determined by the position of the filter in the array. Each FIR filter 50 includes an input port 52 connected to a first input of a multiplier 58(0) and a one inter-pulse time period delay 56(0). A second input to the multiplier 58(0) is the coefficient h(0), with the multiplier 58(0) having an output applied to one input of a summer 54(1). The delay 56(0) includes an output connected to a subsequent one inter-pulse time period delay 56(1) and to a multiplier 58(1) for multiplication with a coefficient h(1). The output of the multiplier 58(1) is connected to the second input of the summer 54(1), with the summer 54(1) having an output connected to the first input of a subsequent summer 54(2). The foregoing interconnection of summers 54, delays 56 and multipliers 58, repeats across the filter for N stages. The output of the final summer 54(N) is connected to an output port 60 of the filter 50. The coefficients h(0) through h(N) are coefficients selected to match the acceleration and velocity rates selected to be detected by the FIR filter 50.

Figure 3:
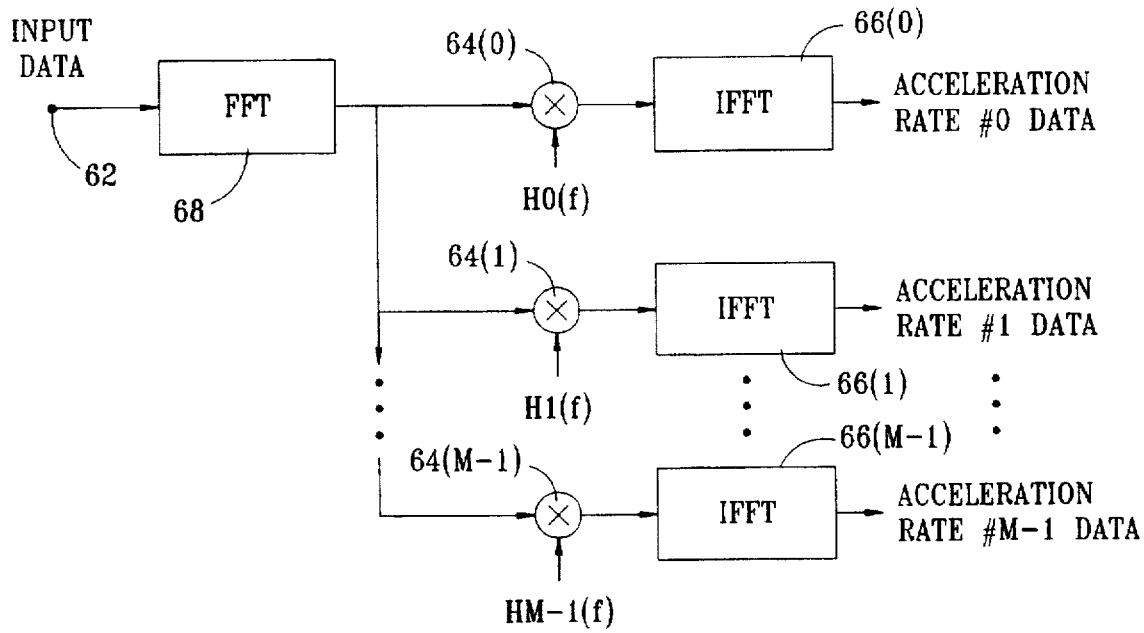
FIG. 3 is a block diagram of a matched filter for frequency domain filtering as part of a linear filter array as an alternate embodiment of the matched filter processor array of FIG. 1.

Referring now to FIG. 3, there is illustrated a second embodiment of the matched filter processor array 44 includes an array of linear filters. The matched filter processor array 44 receives an input signal from the pulse compression network 41 at port 62 and is applied to a fast Fourier transform (FFT) network 68 having an output applied to one input of an array of multipliers 64(0) through 64(M−1). A second input to each of the multipliers 64 is a filter coefficient H0(f) through HM−1 (f) wherein each coefficient frequency is selected based on the position of the filter connected to the multiplier in the processing array. An output of each of the multipliers 64(0) through 64(M−1) is applied to an inverse fast Fourier transform (IFFT) network 66(0) through 66(M−1). The output of each of the inverse fast Fourier transform (IFFT) networks 66 is acceleration rate data varying with the position of the inverse fast Fourier transform network 66 in the array. In this frequency domain filtering embodiment of the processor array 44 only one fast Fourier transform (FFT) network 68 is needed because the filter coefficients H0(f) through HM−1 (f) modify the data after conversion to the frequency domain. The different Hi(f) filter coefficients represent the frequency domain equivalent of the matched filter coefficients needed for the i(th) acceleration filter. These coefficients are obtained by computing the fast Fourier transform of the coefficients h(i) for the FIR filters 50 for each acceleration filter as shown in FIG. 2.

Figures 5, 6:
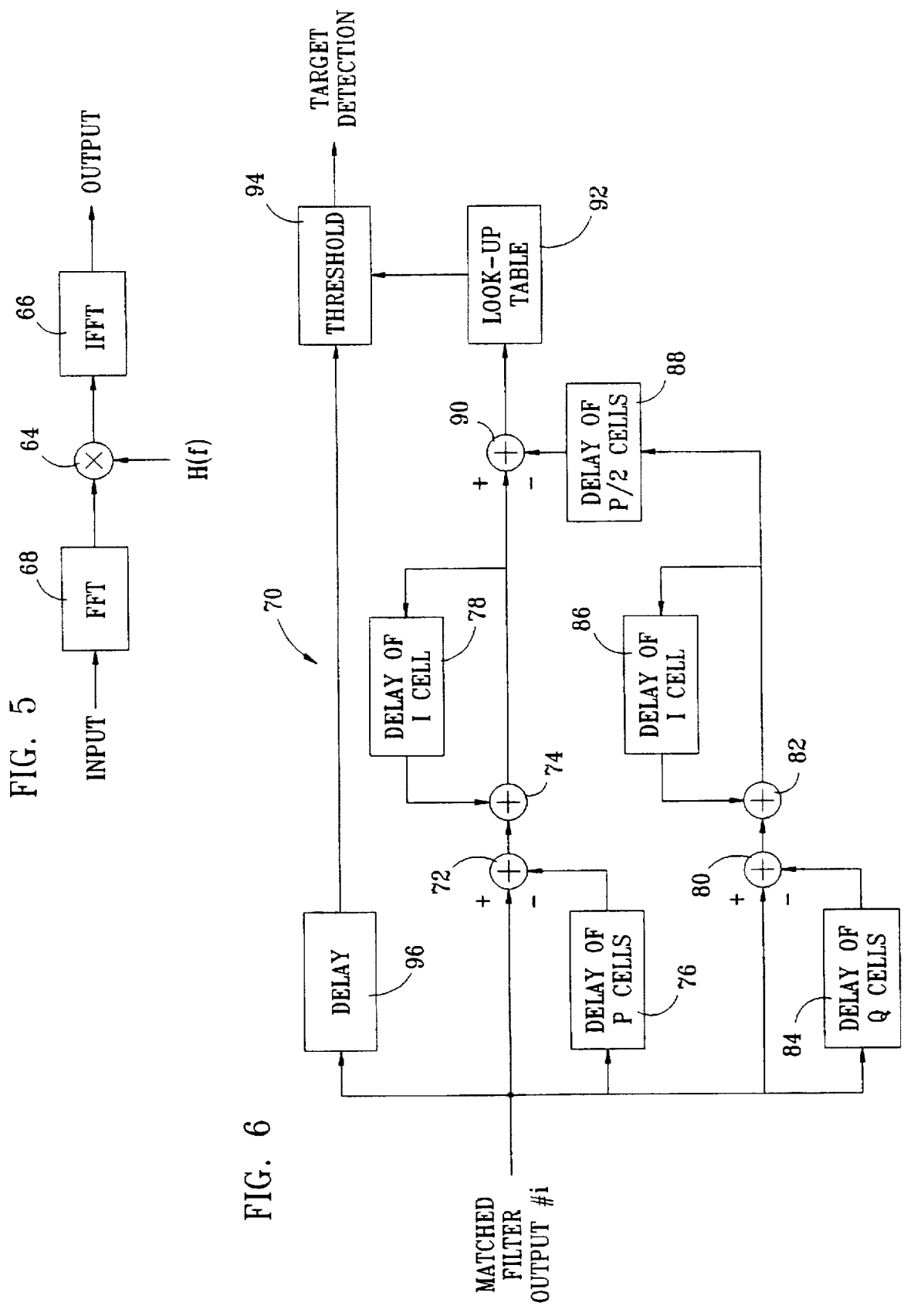

Referring to FIG. 5, there is shown a block diagram illustrating the process for each of the linear filters of the array 44 shown in FIG. 3. The input signal received from the pulse compression network 41 is first transformed into the frequency domain utilizing a fast Fourier transform in the FFT network 68. The output of the FFT network 68 is then multiplied by the frequency domain representation of the filter coefficient H(f) in a multiplier 64. The result of this multiplication, the output of the multiplier 64, is then transformed back into the time domain using an inverse fast Fourier transform as part of the IFFT network 66. The time domain output of the IFFT network 66 is then applied to one of the detectors of the adaptive threshold detector 46 as will be explained.

Referring to FIG. 6, there is shown one embodiment of the adaptive threshold network 46 utilizing a sliding window integrator (SWI) 70. FIG. 6 illustrates one sliding window integrator based adaptive threshold detector of the array of such detectors in the adaptive threshold network 46. Each of the filters in the matched filter processor array 44 is connected in a one-on-one arrangement to one of the sliding window integrator based adaptive threshold detectors shown in FIG. 6. Thus, the system of FIG. 1 includes an equal number of threshold detectors of FIG. 6 as there are filters in the array 44 as illustrated in FIGS. 2 and 3.

An input from one of the filters of the processor array 44 is applied to one input of a summer 72 that is part of a feed forward and feedback pair that also includes a summer 74 connected to the output of the summer 72. The feed forward and feedback pair includes a "delay of P cells" network 76 connected to a second input of the summer 72 and a "delay of one cell" network 78 having an input connected to the output of the summer 74 and an output fed back to a second input of the summer 74.

The input to the SWI 70 is also applied to the "delay of P cells" network 76 and a summer 80 of a feed forward and feedback pair that includes a summer 82 connected to the output of the summer 80. This feed forward and feedback pair includes a "delay of Q cells" network 84 connected to the input of the SWI 70 and has an output connected to a second input of the summer 80. An output of the summer 82 is applied to an input of a "delay of one cell" network 86 in a feedback loop that connects the output of the "delay of one cell" network 86 to a second input of the summer 82.

An output of the summer 82 is also applied to a "delay of P/2 cells" network 88 having an output applied to one input of a summer 90. A second input of the summer 90 is the output of the summer 74. Connected to the output of the summer 90 is a look-up table 92 having an output connected to a threshold detector circuit 94. A second input to the threshold detector 94 is the output of a delay 96 that receives an input from the associated filter of the processor array 44.

The SWI 70 averages the signal return (echo wave) from an associated matched filter of the processor array 44 in the range, velocity, and acceleration in the vicinity of the cell represented by the output of the associated filter. This average, the output of the summer 90, is applied to the look-up table 92 to select one of the stored threshold levels. This threshold level is applied to the center cell in the region being averaged as represented by the input to the threshold detector 94. Typically, the center cell and one cell on either side of the center cell are not part of the average computed by the SWI 70 so that the target return does not bias the threshold selection.

Averaging of the signal return is a function of the feed forward and feedback pair that includes "delay of P cells" network 76 and "delay of one cell" network 78. This feed forward and feedback pair sums the most recent P cells. The similar feed forward and feedback pair including the summers 80 and 82 average the Q cells to be omitted from the average. The omitted cell sum from the output of the summer 82 is delayed to be in alignment with the average of the P cell output from the summer 74. This delay is a function of the "delay of P/2 cells" network 88 and the output is subtracted in the summer 90 to remove the average of the Q cells thereby removing the Q cell influence on the determination of the threshold in the look-up table 92. To match the potential target cell with the computed threshold, the delay 96 inserts the appropriate delay in the output from the associated filter of the processor array 44.

As stated previously, one SWI70 is included in the adaptive threshold 46 for each of the filters in the matched filter processor array 44. Thus, there is an output of a threshold detector 94 for each of the filters of She processor array 44 and this output is processed in the display 42 as an indication of the target substantially free of clutter interference.

Figure 7:
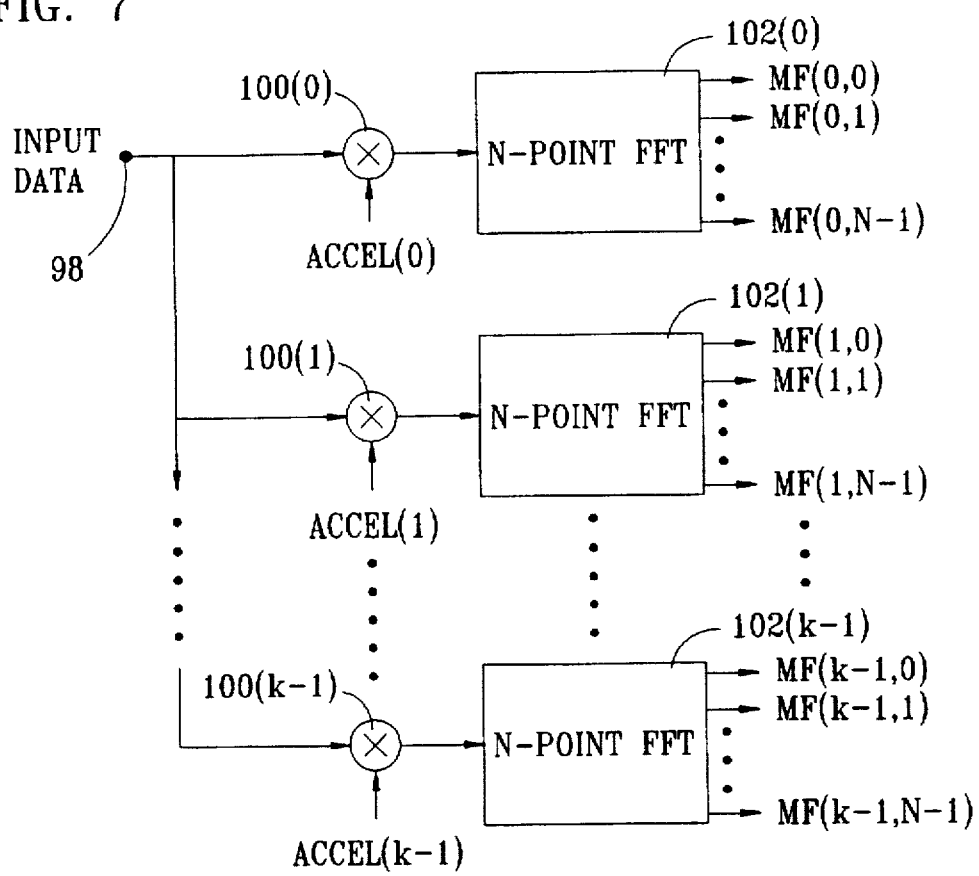
FIG. 7 is a block diagram of a matched filter for frequency domain filtering as part of a linear filter array as a second alternate embodiment of the matched filter processor array of FIG. 1.

Referring now to FIG. 7, there is shown a third embodiment of the match filter processor array 44 that includes an array of N-Point fast Fourier transforms (FFT). The matched filter processor array 44 receives an input from the pulse compression network 41 at an input port 98 and is applied to an array of multipliers 100 (0) through 100 (k−1). A second input to each of the multipliers 100 is an acceleration coefficient ACCEL(0) through ACCEL(k−1), respectively, wherein each acceleration coefficient is selected based on the position of the multiplier in the processing array. An output of each multiplier 100(0) through 100(k−1) is applied to an N-Point fast Fourier transform (N-Point FFT) network 102(0) through 102(k−1). The output of each N-Point FFT network 102 is a velocity term comprising a plurlaity of transform points. For example, but not by way of limitation, each of the FFT networks 102 has a transform length of 128 points. Thus, each of the FFT networks 102 has 128 transform points in the velocity term output. For example, the FFT network 102(0) has 128 transform points MF(0,0) through MF(0,N−1). The output of each of the N-Point FFT networks 102, that is outputs MF(0) through MF(N−1), is applied to an individual detector of the adaptive threshold detector 46 as previously explained with reference to embodiments of the matched filter processor array 44 described in FIGS. 2 and 3.

Several embodiments of the present invention have been described in the foregoing detailed description and illustrated in the accompanying drawings, it will be understood by those skilled in the art that the invention is not limited to the embodiments disclosed but is capable of numerous arrangements, substitutions and modifications without departing from the spirit of the invention.

We claim:

1. A radar system for detecting an accelerating airborne target against a cluttered background comprising:

a transmitter for generating a pulse signal;

an antenna coupled to the transmitter for transmitting the pulse signal and receiving an echo wave from the accelerating airborne target and the cluttered background, said echo wave comprising a target echo wave and a clutter echo wave;

a receiver coupled to the antenna for processing the echo wave;

a plurality of matched filters coupled to the receiver for filtering the processed echo wave, each of the plurality of filters having coefficients to pass a specific target acceleration rate of the target echo wave and to substantially attenuate the clutter echo wave; and a plurality of sliding window integrators connected in a one-on-one arrangement to the plurality of matched filters for processing the output of the associated filter to detect the accelerating airborne target.

2. The radar system in accordance with claim 1 further comprising a display connected to all of the plurality of sliding window integrators for indicating the detected accelerating airborne target.

3. The radar system in accordance with claim 1 wherein said matched filters includes an array of finite impulse response filters having coefficients matching a center frequency and a rate of change in frequency.

4. The radar system in accordance with claim 1 wherein each of said plurality of matched filters comprises a fast Fourier transform coupled to an array of multipliers, each multiplier connects to an inverse Fourier transform for generating acceleration rate data corresponding to a position of the inverse Fourier transform in the processing array.

5. The radar system in accordance with claim 1 wherein each of said plurality of matched filters includes an array of multipliers, each multiplier connected to an N-point fast Fourier transform for generating a velocity term.

6. The radar system in accordance with claim 1 wherein each sliding window integrator includes:

a first feed forward and feedback pair having a delay of P cells;

a second feed forward and feedback pair having a delay of Q cells;

a delay of P/2 cells for substantially removing Q cell influence;

a look up table connected to the first and second feed forward and feedback pairs and the delay of P/2 cells, said look up table includes a plurality of threshold levels used for detecting the accelerating airborne target.

7. An airborne radar system for detecting an accelerating airborne target against a cluttered background comprising:

a transmitter for generating a low repetition pulse signal;

an antenna coupled to the transmitter for transmitting the low pulse repetition signal and receiving an echo wave from the accelerating airborne target and the cluttered background, said echo wave comprising a target echo wave and a clutter echo wave;

a receiver coupled to the antenna for processing the echo wave;

an intermediate frequency oscillator for generating a signal having a predetermined frequency;

a mixer for combining the signal from the intermediate frequency oscillator and the echo wave processed by the receiver;

a low pass filter for removing a substantial portion of an upper sideband from an output signal of the mixer;

a pulse compression network responsive to an output signal from the low pass filter for generating a compressed echo wave;

a processing array having a plurality of matched filters coupled to the pulse compression network for filtering said compressed echo wave, each of the plurality of filters having coefficients for passing a predetermined target acceleration rate of the target echo wave and substantially attenuating the clutter echo wave;

a plurality of adaptive threshold detectors connected in a one-on-one arrangement to the plurality of matched filters for processing the output of the associated filter to detect the accelerating airborne target; and a display coupled to the plurality of adaptive threshold detectors for indicating the detected accelerating airborne target.

8. The airborne radar system in accordance with claim 7 wherein said matched filters includes an array of finite impulse response filters having coefficients matching a center frequency and a rate of change in frequency.

9. The airborne radar system in accordance with claim 7 wherein each of said plurality of matched filters comprises a fast Fourier transform coupled to an array of multipliers, each multiplier connects to an inverse Fourier transform for generating acceleration rate data corresponding to a position of the inverse Fourier transform in the processing array.

10. The airborne radar system in accordance with claim 7 wherein each of said plurality of matched filters includes an array of multipliers, each multiplier connected to an N-point fast Fourier transform for generating a velocity term.

11. The airborne radar system in accordance with claim 7 wherein each of said plurality of adaptive threshold detectors includes a sliding window integrator.

12. An airborne radar system for detecting an accelerating airborne target against a cluttered background comprising:

a transmitter for generating a low repetition pulse signal;

an antenna for transmitting the low repetition pulse signal and receiving an echo wave from the accelerating airborne target and the cluttered background, said echo wave comprising a target echo wave and a clutter echo wave;

a receiver coupled to the antenna for processing the echo wave;

a processing array having a plurality of matched filters coupled to the receiver for filtering said echo wave, each of the plurality of matched filters having a coefficient for passing a predetermined target acceleration rate of the target echo wave and substantially attenuating the clutter echo wave;

a plurality of sliding window integrators connected in a one-on-one arrangement to the plurality of matched filters for processing the output of the associated filter to detect the accelerating airborne target, each sliding window integrator comprising:

a first feed forward and feedback pair having a delay of P cells;

a second feed forward and feedback pair having a delay of Q cells;

a delay of P/2 cells for removing of Q cell influence;

a look-up table connected to the first and second feed forward and feedback pairs and the delay of P/2 cells, said look up table includes a plurality of threshold levels used for detecting the accelerating airborne target; and a display coupled to the plurality of adaptive threshold detectors for indicating the detected accelerating airborne target.

13. The airborne radar system in accordance with claim 12 wherein each of said plurality of matched filters comprises an array of finite impulse response filters having coefficients matching a center frequency and a rate of change in frequency.

14. The airborne radar system in accordance with claim 12 wherein each of said plurality of matched filters comprises a fast Fourier transform coupled to an array of multipliers, each multiplier connects to an inverse Fourier transform for generating acceleration rate data corresponding to a position of the inverse Fourier transform in the processing array.

15. The radar system in accordance with claim 12 wherein each of said plurality of matched filters comprises an array of multipliers, each multiplier connected to an N-point fast Fourier transform for generating a velocity term.

16. A method for detecting an accelerating airborne target against a cluttered background, comprising the steps of:

transmitting a low repetition pulse signal toward the accelerating airborne target;

receiving an echo wave from the accelerating airborne target and the cluttered background, said echo wave comprising a target echo wave and a clutter echo wave;

filtering said echo wave to pass a predetermined acceleration rate of the target echo wave and to substantially attenuate the clutter echo wave; and detecting the accelerating airborne target by integrating the predetermined acceleration rate.

17. The method in accordance with claim 16 further comprising a step of minimizing a sidelobe of the target echo wave by applying a weighing function to the target echo wave.

18. The method in accordance with claim 16 further comprising a step of displaying the detected accelerating airborne target.

* * * * *